United States Patent
Cognolato et al.

(10) Patent No.: US 11,585,378 B2
(45) Date of Patent: Feb. 21, 2023

(54) SEALING DEVICE FOR A BEARING UNIT

(71) Applicant: Aktiebolaget SKF, Gothenburg (SE)

(72) Inventors: Gianni Alvise Cognolato, Moncalieri (IT); Ciro Raia, Turin (IT)

(73) Assignee: AKTIEBOLAGET SKF

( * ) Notice: Subject to any disclaimer, the term of this patent is extended or adjusted under 35 U.S.C. 154(b) by 76 days.

(21) Appl. No.: 17/358,067

(22) Filed: Jun. 25, 2021

(65) Prior Publication Data

US 2022/0003275 A1 Jan. 6, 2022

(30) Foreign Application Priority Data

Jul. 1, 2020 (IT) .................. 102020000015814

(51) Int. Cl.
*F16C 33/78* (2006.01)

(52) U.S. Cl.
CPC ...... *F16C 33/7823* (2013.01); *F16C 33/7883* (2013.01); *F16C 2240/30* (2013.01)

(58) Field of Classification Search
CPC .............. F16C 33/7823; F16C 33/7876; F16C 33/7883; F16J 15/3204; F16J 15/3232; F16J 15/3236
See application file for complete search history.

(56) References Cited

U.S. PATENT DOCUMENTS

| | | |
|---|---|---|
| 3,921,990 A | 11/1975 | Johnston et al. |
| 4,167,981 A | 9/1979 | Bertin |
| 2011/0304102 A1 | 12/2011 | Yoshida et al. |
| 2018/0283455 A1 * | 10/2018 | Iizuka ................ F16C 33/7846 |

FOREIGN PATENT DOCUMENTS

| | | | | |
|---|---|---|---|---|
| CN | 101517285 A | * | 8/2009 | ......... F16C 33/7823 |
| CN | 113623323 A | * | 11/2021 | |
| DE | 102016209111 A1 | * | 12/2016 | ............ B60K 17/24 |
| DE | 102017114858 A1 | * | 1/2019 | |
| DE | 102017121012 A1 | * | 3/2019 | |
| JP | 2013142444 A | * | 7/2013 | ......... F16C 33/7823 |
| JP | 5545210 B2 | * | 7/2014 | ............ B65G 39/09 |
| RU | 2428613 | | 9/2011 | |

OTHER PUBLICATIONS

Search Report for corresponding Italian Patent Application No. 2020000015814 dated Feb. 26, 2021.

* cited by examiner

*Primary Examiner* — Phillip A Johnson
(74) *Attorney, Agent, or Firm* — Reed Smith LLP

(57) ABSTRACT

Sealing device for a bearing unit having at least one contact lip operatively in sliding contact with a contact surface of the bearing unit and in turn provided with a wedge portion which forms with respect to the contact surface a first angle (α) facing a medium to be contained and a second angle (β) opposite the first angle, wherein during operating conditions, the second angle (β) is smaller than the first angle (α) and with a first surface having a concave shape, the concavity of which is defined by a first radius (R1); wherein the second angle (β) is between 48° and 55° and the length of the first radius (R1) is between 2.0 mm and 10.00 mm.

20 Claims, 2 Drawing Sheets

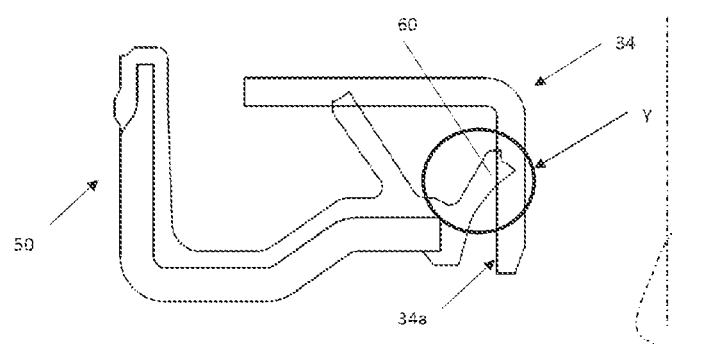
Fig. 2
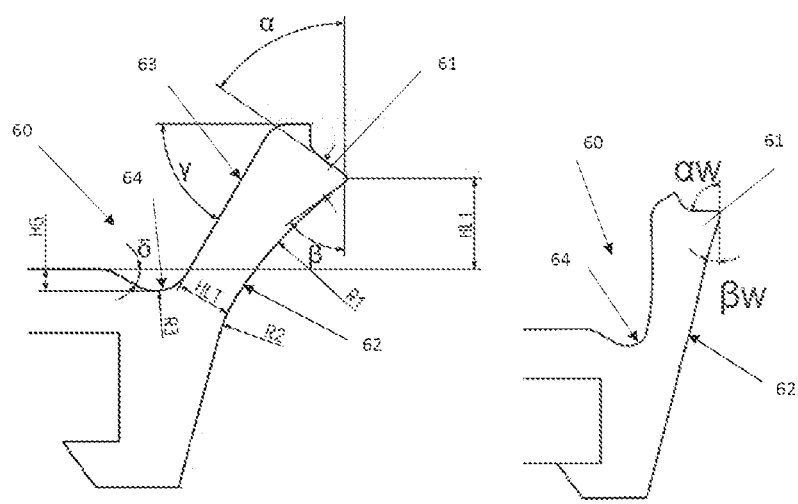
Fig. 3 – Detail Y
Fig. 4 – Detail Yw

SEALING DEVICE FOR A BEARING UNIT

CROSS-REFERENCE RELATED APPLICATIONS

This application is based on and claims priority to Italian Patent Application No. 102020000015814 filed on Jul. 1, 2020, under 35 U.S.C. § 119, the disclosure of which is incorporated by reference herein.

FIELD

The present invention relates to a sealing device for a bearing unit, said device being applied, preferably, but not exclusively, to a wheel hub assembly.

BACKGROUND

Certain sealing devices consist of two-piece cassette seals, comprising a rotating portion mounted, for example, on the radially inner ring and a stationary portion mounted, for example, on the radially outer ring. In such sealing devices, the stationary portion of the seal comprises one or more lips of elastomeric material which make contact with the rotating portion and ensure a sealing action with respect to the interior of the said bearing unit. Certain other sealing means consist of a single piece and are integral with one of the rings of the bearing unit, wherein at least one contact lip ensures the seal owing to the interference which is created during assembly of the seal in relation to a surface of the other ring of the bearing unit.

DESCRIPTION OF THE DRAWINGS

The invention will now be described with reference to the accompanying drawings which illustrate a non-limiting example of embodiment thereof, in which:

FIG. 2 show a sealing device for a bearing unit;

FIG. 3 is a detail of a contact lip of a sealing device according to FIG. 2, according to an embodiment of the present invention; and FIG. 4 is the same detail as that shown in FIG. 3, where the contact lip is shown in an operating condition.

DETAILED DESCRIPTION

Figure 1:
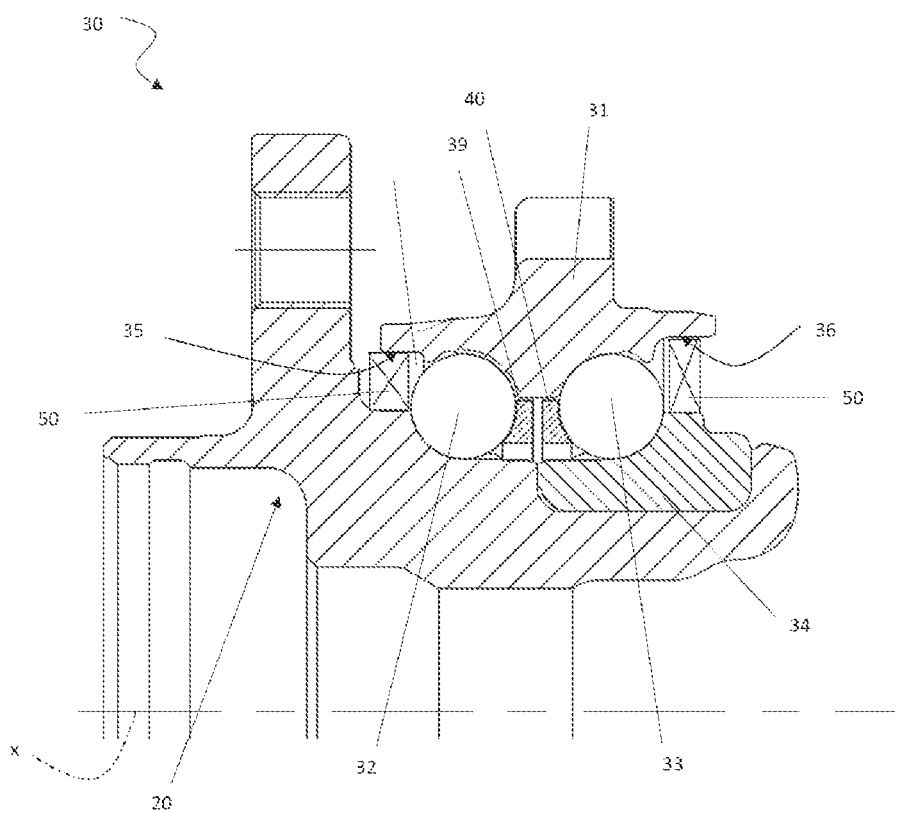
FIG. 1 is a cross-section through a wheel hub assembly provided with a bearing unit.

In known sealing devices and sealing means a contact lip will be subject to a relative sliding movement with respect to the surface for which the sealing action is to be ensured. The sealing performance is ensured by a correct balance between the contact force and the local pressure between the contact surfaces. Therefore, for the same contact force, the pressure peak which ensures the correct sealing performance increases as the contact surface area decreases to remain below suitable design values.

Also as a result also of the ever-increasing global competition, there is a constant demand by clients, namely motor vehicle manufacturers, for continuous technical or cost-related improvements to wheel hub assemblies. In particular, there is a constant demand for an increase in the performance or a reduction in weight of the entire assembly. Solutions for such considerations are sought after, naturally, without a further increase in costs. As regards a sealing means there is a demand for better performance results in terms of reliability and duration over time, but with operating conditions (loads induced by a specific application) which are increasingly severe and seating spaces inside the bearing unit which are increasingly smaller in size. In order to meet this demand, the sealing means must operate with a balance between the dimensions of the lips and the maximum interference as per design, which result in the lips having much broader contact zones and a consequent decline in the performance of the contact lips.

In fact a contact lip (the reference numbers below may be seen in FIG. 3 which will be subsequently explained for the purposes of the present invention), making contact for example in the radial direction, has a wedge portion which forms with respect to the contact surface a first angle $\alpha$ which faces the medium to be contained and a second angle $\beta$ opposite the first angle. During operating conditions, the first angle $\alpha$ must be constantly greater than the second angle $\beta$, when a lip, which is for example stationary, is in contact with the contact surface, which is for example rotating. This asymmetry between the angles creates the desired pressure distribution with a peak directed towards the medium to be sealed. These angles are simply obtained by connecting straight portions of the lip. With an increase in the level of interference, this type of configuration becomes rapidly inefficient since a part of the lip facing angle $\beta$ becomes flat on the contact surface, the contact area increases and the consequent reduction in pressure reduces the sealing efficiency. In order to reduce this effect, the length of the lip HL1 should be as large as possible so that, for the same interference values, the angle of rotation of the lip is smaller. This measure, however, is incompatible with the need to reduce the spaces available for seating the seals.

A known solution for reducing this so-called "flattening" effect is that where the contact area is delimited by three straight portions with different angles of inclination $\alpha$, $\beta$ and $\gamma$ which have the purpose of reducing the contact area when greater interference values occur in relation to the contact surface. In this case also, the longer the lip, the smaller its angle of rotation for the same interference. This solution is effective when the balance between the length of the lip and the level of interference is below a transition value, but, with an increase in this value, the "flattening" effect continues to occur, with the aforementioned consequences.

It is therefore necessary to define a sealing device provided with at least one contact lip, the form of which is optimized so that the sealing device for a bearing unit is without the aforementioned drawbacks.

Embodiments in accordance with this disclosure are particularly suitable for bearing units which have a space for seating small-size sealing devices.

This present solution may be applied to all generations of wheel hub assemblies. In particular, such applications include both the case where the outer ring of the bearings is rotatable, while the inner rings of the bearing are fixed, and the opposite case where the inner rings rotate and the outer ring is fixed. Embodiments are also suitable for any type of rolling body (balls, rollers, tapered rollers, etc.).

Purely by way of a non-limiting example, the present invention will now be described with reference to a bearing unit 30, preferably a wheel hub assembly for motor vehicles provided with a bearing unit having a sealing device according to the present invention.

With reference to FIG. 1, 30 denotes in its entirety a bearing unit or wheel hub assembly. The unit has a central axis X of rotation and includes a rotatable, radially inner, flanged ring 20; a stationary, radially outer, ring 31; a further, rotatable, radially inner ring 34 which is mounted on and integral with the flanged ring 20; a plurality of rolling bodies 32, 33, in this example balls, arranged between the radially outer ring 31 and the flanged ring 20; two cages 39 and 40 for keeping in position the rolling bodies of the rows of rolling bodies 32, 33.

In the whole of the present description and in the claims, the terms and the expressions indicating positions and orientations such as "radial" and "axial" are understood as referring to the central axis of rotation X of the bearing unit 30. Expressions such as "axially outer" and "axially inner" instead relate to the assembled condition of the wheel hub assembly and, in the case in question, preferably, relate to a wheel side and to a side opposite to the wheel side, respectively.

The flanged ring 20 and the radially outer ring 31 define, together and at the axially opposite ends of the bearing unit 30, two interspaces 35, 36 which, if not screened, would allow the entry inside the said bearing unit 30 of contaminants and impurities.

Therefore, in order to shield the bearing unit 30, at least one sealing device 50, realized in accordance with the principles of the present invention, is mounted inside at least one of the two interspaces 35, 36.

Normally sealing devices 50 comprise either two metallic screens facing each other, at least one of which is provided with one or more sealing lips made of elastomeric material in sliding contact with the other screen, or only one metallic screen which has one or more sealing lips which are made of elastic material and which make sliding contact with a sliding surface of the bearing unit 30 in relative movement with respect to the said seals.

Below, and with reference to FIG. 2, purely by way of example, a case where sealing device 50 comprises at least one stationary contact lip 60 will be described, said lip making contact in the radial direction with a surface 34a of the rotating flanged ring 20.

The new form of the contact lip 60, according to the present invention, is described with reference to the detail of the lip shown in FIG. 3 (undeformed condition) and in FIG. 4 (deformed or working condition). The new form has been defined taking into account the main objectives which are: reduction of the flattening of the contact surface during operating conditions, maintaining an edge-like contact area upon variation of the interference between contact lip 60 and contact surface 34a, maintaining high pressure peaks upon variation of the interference value, the possibility of operating with higher contact forces while maintaining suitable pressures owing to control of the contact areas also using a higher range of interference values, greater flexibility and lower deformation values of the contact lip 60.

In embodiments, a first radius R1 is introduced and the ratio $\alpha/\beta$ (between the first angle $\alpha$ facing the medium to be contained and the second angle $\beta$ opposite the first angle, namely the angles which define a wedge portion 61 of the contact lip 60) is reduced. Owing to the presence of the radius R1, angle $\beta$ is measured at the tangent with the sealing edge. More precisely, it may be stated that the absolute value of the second angle $\beta$ has been increased and this increase is linked also to the creation of a first surface 62 with a concave shape defined by the first radius R1. The first radius R1 is connected to a second radius R2 (with R1>R2), where the second radius R2 is proximal to the base of the contact lip 60. These two characteristics (first radius R1 and ratio $\alpha/\beta$) ensure a more uniform distribution of the pressures and reduction in the flattening effect of the lip, except in the case of very high interference values which in any case occur outside of operating conditions. The curved form of the lip, namely the first concave surface 62, withstands better those deformations acting on the contact lip 60 during operating conditions, reducing the absolute values thereof. Basically flattening of the contact lip 60, namely the creation of a flat surface also for high interference values, for example equal to 0.45 mm, is avoided. This allows a smaller contact area to be maintained between the wedge portion 61 of the contact lip 60 and the contact surface 34a. Consequently the pressure peaks in the contact area are kept high and the sealing performance is not negatively affected in any way. In FIG. 4 it is possible to note the following in respect of that described above: owing to the interference during operating conditions and consequent deformations of the contact lip 60, the first contact surface 62 tends to become flat, the absolute value of the second angle $\beta$ which in FIG. 4 is indicated as $\beta w$ is reduced, but in any case remains substantially greater than 0°, i.e., flattening of the lip on the contact surface does not occur, while, as was to be expected, there is an increase in the value of the first angle $\alpha$ which in FIG. 4 is indicated as aw.

Therefore, the definition of the first radius R1, namely of the first concave surface 62, has the effect that the latter more effectively withstands deformations. The flexing area is thus reinforced and flattening of the contact lip 60 is delayed.

Moreover, the first radius R1 and the second angle $\beta$ allow the contact lip 60 to operate as an edge for the whole range of the interference values. It may be noted, in fact, still with reference to FIG. 4, that the wedge portion 61 of the contact lip 60 is deformed very little or not all and remains fully intact even in working conditions.

Calculations and a series of experimental tests carried out show that that first radius R1 may assume optimum values of between 2.0 mm and 10.0 mm. The second angle $\beta$ may assume values of between 48° and 55°, while the first angle $\alpha$ may assume values of between 50° and 65°. Since the condition $\beta<\alpha$ must always be satisfied, in particular during operating conditions, an optimum pair of values may be: $\alpha=55°$, $\beta=54°$.

A third angle $\gamma$ is also an important dimensional parameter of the contact lip 60. The third angle $\gamma$ is defined as being the angle between the radial direction and a second surface 63, opposite to the first concave surface 62, with respect to the wedge portion 61. An optimum combination of values of the angles $\gamma$ and $\beta$, together with the other dimensions which characterize the curvature of the contact lip 60, ensures a constant pressure peak and high value in the case of variation of the interference. The third angle $\gamma$ must vary between 50° and 65°, preferably, and as shown by tests carried out, may have a value of 60°.

Moreover, another important parameter is the base thickness HLT measured at the base of the lip on the opposite side to the contact surface 34a. The base thickness HLT of the contact lip 60, together with the first radius R1, at the second angle $\beta$ and at the third angle $\gamma$, provides the contact lip 60 with the capacity to maintain a constant force upon variation of the interference value, varying the rigidity modulus of the material. Advantageously, the HLT thickness must be between 0.3 mm and 1.2 mm.

Another important zone of the contact lip 60 is the flexing portion situated at the base of the lip on the opposite side to the contact surface 34a. Preferably, according to the present invention, a third surface 64 with a more accentuated concavity than that of the first surface 62 has been created. Basically the third surface 64 creates a kind of recess at the base of the contact lip 60. The pronounced concavity of the third surface 64 improves the flexibility of the contact lip 60, a further feature which helps maintain a constant contact force even when there is an increase in the interference. In this way the pressure peaks remain at optimum values within a broader range of interference values, since the amplitude of the contact areas is kept constantly smaller and no transition behaviour, guided by the flattening effect, is visible within the working range which covers the normal conditions of the applications. The third concave surface 64 is defined by an angle of attack δ, formed with the radial direction, by the depth HG of the recess and by a third radius R3 which defines the concavity of the third surface 64. The recess thus defined by these three parameters provides the contact lip 60 with an increased flexibility since it moves the centres of the second radius R2 and the third radius R3 towards the zone of the "hinge" which is formed in the region of the base thickness HLT, lowering also the deformation levels in the hinge itself. The optimum values for the angle of attack δ vary from 20° to 35° and is preferably 30°; the depth of the recess HG may vary from 0.1 mm to 0.5 mm, the value of the second radius R2 will vary from 0.8 mm to 3.2 mm, while the third radius R3 will vary from 0.2 mm to 0.8 mm, whereby R3 must always be <R2.

Basically, the proposed solution:
improves the value of the contact pressure within a higher range of interference values;
eliminates the flattening effect of the surface, increasing the possible range of interference values to be used;
allows optimization of the contact forces which are constant over a wide interference range, maintaining greater values of the contact pressure also for higher interference values;
increases the flexibility of the contact lip, while reducing the deformation peaks of the lip itself.

In order to solve substantially the aforementioned technical problems, one object of the present invention is to provide a sealing device for a bearing unit, where the sealing device is provided with a contact lip having an improved shape.

This object is achieved by forming the contact lip so that it has a concave form which is able to withstand better the deformations acting on the contact lip during operation, reducing the absolute values thereof. Furthermore, there is a reduction in the ratio α/β between the angle facing the medium to be contained and the angle opposite the first angle, namely the angles which define a wedge portion of the contact lip which interferes with the contact surface in relation to which the lip provides the sealing action.

Furthermore, a further improvement of the design may be achieved by modifying the flexing portion situated at the base of the lip on the opposite side to the contact surface, such as to create a concave surface, namely a recess at the base of the contact lip. The pronounced concavity of this surface improves the flexibility of the contact lip and helps maintain a constant contact force even when there is an increase in the interference.

This optimized form improves the behaviour of the lip in the case where there is a high interference with the contact element, for example, the radially inner ring or the radially outer ring of the bearing unit, since the degree of the local deformation and therefore the contact width of the lip with the contact element are reduced. Consequently the local pressure peaks and therefore the sealing performance are increased.

Advantageously, the invention is applicable to a radial contact lip and even more advantageously to a contact lip of a sealing device, the seating space of which inside the bearing unit is small in size, typical of the more recent applications; however the design is scalable and the performance remains constant also in the case of larger dimensions of the lip.

Therefore, according to the present invention a sealing device for a bearing unit comprising a contact lip having the characteristic features illustrated in the independent claim, attached to the present description, is provided.

The present invention also relates to a bearing unit and, in particular, to a bearing unit for a wheel hub assembly provided with a sealing device according to one of the embodiments of the present invention.

Further preferred and/or particularly advantageous embodiments of the invention are described in accordance with the characteristic features indicated in the attached dependent claims.

In addition to the embodiment of the invention, as described above, it must be understood that numerous other variants exist. It must also be understood that these embodiments are only examples and do not limit either the scope of the invention, nor its applications, nor its possible configurations. On the contrary, although the description above allows the person skilled in the art to implement the present invention at least according to one of its examples of embodiment, it must be understood that many variants of the components described are possible, without thereby departing from the scope of the invention, as defined in the accompanying claims, interpreted literally and/or in accordance with their legal equivalents.

The invention claimed is:

1. A sealing device for a bearing unit, comprising:
at least one contact lip which is operatively in sliding contact with a contact surface of the bearing unit, the at least one contact lip including:
a wedge portion which forms with respect to the contact surface a first angle (α) facing a medium to be contained, the wedge portion further forms with respect to the contact surface a second angle (β) opposite to the first angle, wherein the wedge portion is configured such that during operating conditions the second angle (β) is less than the first angle (α); and
a first surface, adjacent to the second angle (β), with a concave shape, the concavity of which is defined by a first radius (R1).

2. The sealing device of claim 1, wherein the second angle (β) is between 48° and 55°.

3. The sealing device of claim 1, wherein the length of the first radius (R1) is between 2.0 mm and 10.0 mm.

4. The sealing device of claim 1, wherein the first angle (α) is between 50° and 65°.

5. The sealing device of claim 1, wherein the first angle (α) is equal to 55° and the second angle (β) is equal to 54°.

6. The sealing device of claim 1, further comprising a third angle (γ) between a radial direction and a second surface, opposite the first surface with respect to the wedge portion, where the third angle (y) is between 50° and 65°.

7. The sealing device of claim 1, wherein a base thickness (HLT) of the contacting lip is between 0.3 mm and 1.2 mm.

8. The sealing device of claim 1, further comprising a third concave surface defined by an angle of attack (δ), formed with the radial direction, by a depth (HG) and by a third radius (R3).

9. The sealing device of claim 8, wherein the angle of attack (δ) is between 20° and 35°.

10. The sealing device of claim 8, wherein the depth (HG) is between 0.1 mm and 0.5 mm.

11. The sealing device of claim 8, wherein the third radius (R3) is between 0.2 mm and 0.8 mm.

12. A bearing unit provided with a sealing device according claim 1.

13. A sealing device for a bearing unit, comprising:
at least one contact lip which is operatively in sliding contact with a contact surface of the bearing unit, the at least one contact lip including:
a wedge portion which forms with respect to the contact surface a first angle ($\alpha$) facing a medium to be contained, the wedge portion further forms with respect to the contact surface a second angle ($\beta$) opposite to the first angle, wherein the wedge portion is configured such that during operating conditions the second angle ($\beta$) is less than the first angle ($\alpha$); and
a first surface, adjacent to the second angle ($\beta$), with a concave shape, the concavity of which is defined by a first radius (R1), wherein the second angle ($\beta$) is between 48° and 55°, and further wherein the length of the first radius (R1) is between 2.0 mm and 10.0 mm.

14. A sealing device for a bearing unit, comprising:
at least one contact lip which is operatively in sliding contact with a contact surface of the bearing unit, the at least one contact lip including:
a wedge portion which forms with respect to the contact surface a first angle ($\alpha$) facing a medium to be contained, the wedge portion further forms with respect to the contact surface a second angle ($\beta$) opposite to the first angle, wherein the wedge portion is configured such that during operating conditions the second angle ($\beta$) is less than the first angle ($\alpha$);
a first surface, adjacent to the second angle ($\beta$), with a concave shape, the concavity of which is defined by a first radius (R1); and
a third concave surface defined by an angle of attack ($\delta$), formed with the radial direction, by a depth (HG) and by a third radius (R3), wherein the second angle ($\beta$) is between 48° and 55°, and further wherein the length of the first radius (R1) is between 2.0 mm and 10.0 mm.

15. The sealing device of claim 14, wherein the angle of attack ($\delta$) is between 20° and 35°.

16. The sealing device of claim 14, wherein the depth (HG) is between 0.1 mm and 0.5 mm.

17. The sealing device of claim 14, wherein the third radius (R3) is between 0.2 mm and 0.8 mm.

18. The sealing device of claim 14, wherein the length of the first radius (R1) is between 2.0 mm and 10.0 mm.

19. The sealing device of claim 14, wherein the first angle ($\alpha$) is equal to 55° and the second angle ($\beta$) is equal to 54°.

20. The sealing device of claim 14, further comprising a third angle ($\gamma$) between a radial direction and a second surface, opposite the first concave surface with respect to the wedge portion, where the third angle ($\gamma$) is between 50° and 65°.

* * * * *